A. E. PETERS.
CENTERING DEVICE.
APPLICATION FILED APR. 15, 1920.
1,379,935.
Patented May 31, 1921.
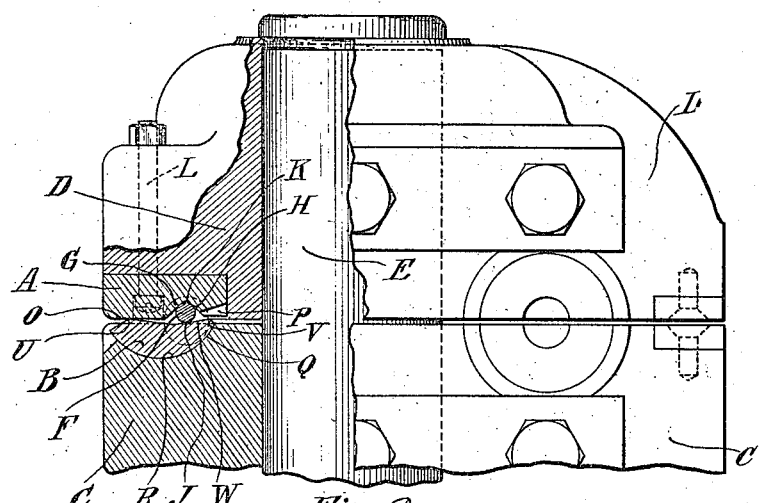
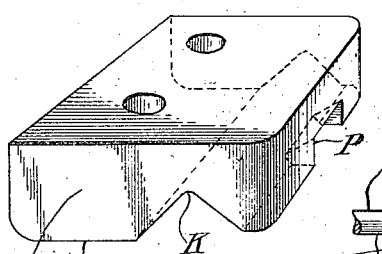
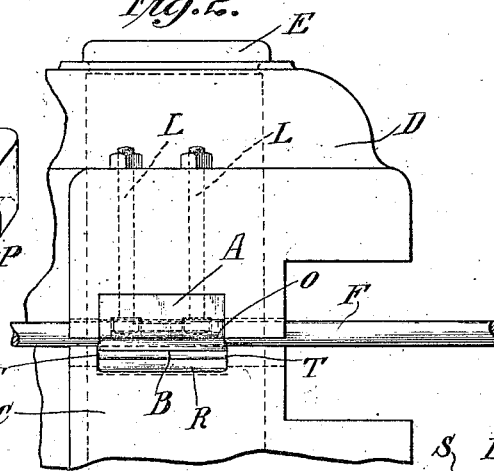
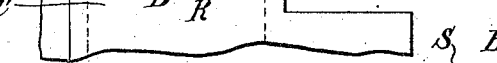
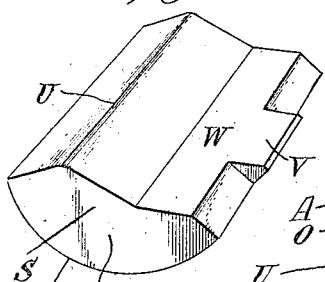
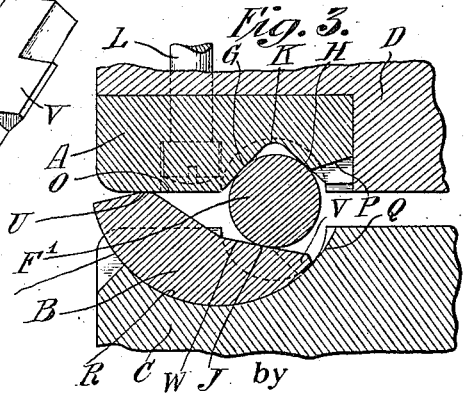
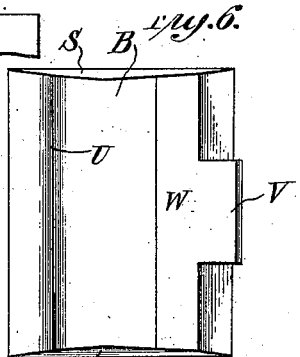
Inventor:
Arthur E. Peters
Herbert E. Ogden
Atty.

UNITED STATES PATENT OFFICE.

ARTHUR E. PETERS, OF LITTLETON, COLORADO, ASSIGNOR TO INGERSOLL-RAND COMPANY, OF JERSEY CITY, NEW JERSEY, A CORPORATION OF NEW JERSEY.

CENTERING DEVICE.

1,379,935.           Specification of Letters Patent.     Patented May 31, 1921.

Application filed April 15, 1920. Serial No. 374,178.

*To all whom it may concern:*

Be it known that I, ARTHUR E. PETERS, a citizen of the United States, residing at Littleton, in the county of Arapahoe and State of Colorado, have invented a certain new and useful Improvement in Centering Devices, of which the following is a specification.

This invention relates to centering devices but more particularly to apparatus of this kind adapted to accurately position cylindrical articles of various sizes, as for instance drill steels, and clamp them securely so that the center will always lie in the same axial plane at a constant distance from the bed of the machine regardless of the diameter of the article.

The device of the present invention is specially adapted for use in connection with drill sharpening machines in which drill steels of different diameters are required to be quickly clamped in position with the axis of the drill steel in a fixed plane so that it may be accurately alined with a pinning out machine, percussive tool, or other tool or device which may be located on the drill sharpening machine and adapted to operate upon the drill steel.

The primary objects of the invention are to improve upon and simplify the construction of devices of this kind, secure a centering device which is durable and readily and cheaply manufactured and reduce the number of parts which coöperate automatically to simultaneously clamp and accurately position cylindrical articles of different sizes at a constant distance from the face of a drill sharpener or other machine.

With these and other objects in view the invention consists in the features of construction and combinations of elements set forth in the following specification as specified in the claims and illustrated in the accompanying drawings, forming a part hereof, in which, Figure 1 is a front view of a portion of a drill sharpening machine having the device of the present invention applied thereto, the essential parts being shown in vertical section. A drill steel of suitable diameter is shown clamped and positioned by the centering device;

Fig. 2 is a side view;

Fig. 3 is an enlarged detail transverse sectional view of the centering members showing a drill steel of larger diameter than that shown in Fig. 1 clamped and positioned between the members;

Fig. 4 is a perspective view of the upper vertically movable non-adjustable clamping block forming one of the centering members of the device;

Fig. 5 is a similar view of the lower movable clamping block forming the other clamping member; and Fig. 6, a top plan view of the movable member shown in Fig. 5.

In carrying out this invention, clamping blocks A and B are conveniently provided upon the operative parts of a drill sharpener, one block B being mounted on the face of the stationary body portion C of the machine and the other block A being mounted on the vertically movable cross-head D carried by the plunger rod E adapted to be actuated by a piston (not shown) operating in the body portion C. These clamping blocks A and B form the centering and positioning members of the device between which drill steels F and F' for instance of different sizes may be clamped and centered with the axis of the steel at a constant distance from the face of the body portion C. It is important that the drill steel F not only be centered at a constant distance from the face of the body portion, but it should be so held that it is prevented from slipping longitudinally and from rotating during the operations to be carried out on the steel, as for instance punching and pinning out, well understood in the art. With these considerations in view, I have devised and constructed clamping blocks A and B which automatically clamp the drill steels with their axis at a constant distance from the face of the body portion C and hold the steels of different sizes with a wedging action which prevents both slipping and rotation. In order to effect the wedging action on the cylindrical surface of the steel to be clamped, I employ the principle of three point contact between the blocks A and B and the steel, and I provide two points of contact G and H between one of the blocks, as the block A, and the steel, and one point of contact J between the other block B and the steel. These points of contact, G, H and J are suitably spaced in an angular direction so that a gripping and wedging action is produced upon the steel which securely holds it in a vise like grip effectually locked against slip and rotation. Any tendency of the steel to rotate causes a firmer grip of the blocks A and B upon the steel which cannot become unlocked except by relieving the pressure of the blocks upon the steel. Obviously the gripping force at any two points of contact is opposed by the gripping pressure at the third point of contact producing the required wedging action upon the steel.

One of the important features of the invention also resides in the fact that I am enabled to automatically obtain three point gripping contact between the blocks A and B and steel F of any suitable diameter while maintaining the axis of the steel at a constant distance from the face of the body portion C of the drill sharpener, and I am enabled to obtain this automatic centering and gripping of steels of various sizes without separate adjusting means for either one of the clamping blocks A or B which automatically accommodate themselves to the various steels to be operated upon without mechanical adjusting devices.

Referring more particularly to the drawings, the block A formed with the longitudinal V-shaped clamping groove K, preferably forms the upper positioning and centering member and may conveniently be secured to the movable cross-head D as by means of the bolts L countersunk in the body of the block. The upper block A is also formed with the bearing surface O and the guide recess P adapted to coöperate with the lower block B in the manner to be described. The upper block A thus forms a reciprocating member, movable in a vertical plane to and from the lower block B.

The block B is so constructed and mounted on the stationary body portion C of the machine that it may rock or tip in a horizontal plane to accommodate steels of different sizes between the blocks. I have found that the simple construction shown in the drawings is durable and capable of withstanding impact and severe strains without breaking. As shown, the body portion C is provided with a recess Q having an arc shaped or curved bottom and the block B is formed with a convex surface conforming to the shape of the recess Q. The ends of the block B are preferably beveled at S to conform to undercut portions T at the sides of the recess Q so that the block B may slide in the recess Q but is restrained from bodily vertical movement.

The block B as shown is formed with the rounded edge U upon which the surface O of the upper block is adapted to bear, and also provided with the guiding tongue V adapted to enter the guiding recess P in the upper block A. The surface W of the block B is adapted to bear upon the drill steel along one point of contact as indicated at J.

In the operation of the centering device, the drill steel is placed upon the face W of the block B and as the cross-head D is lowered the bearing surface O of the block A bears upon the bearing edge U of the lower block B and automatically moves the lower block in its seating recess into final engaging and clamping position to clamp the steel between the two blocks A and B at three points of contact. The block B will automatically adjust itself to proper position with steels of different sizes and the axis of the steel being clamped will always be at a constant distance from the face of the body portion C.

It is to be understood that while the present showing and description disclose but one specific embodiment of the invention, other forms and modifications are included within the spirit and scope of the same as expressed in the appended claims.

I claim:

1. A centering device for centering cylindrical articles comprising two relatively movable members, one having a clamping recess and the other having a clamping surface, and including means for automatically moving said member having the clamping surface to center and clamp articles of different sizes between the members at a constant distance from a given base.

2. A centering device for centering cylindrical articles comprising two relatively movable members, one having a clamping recess adapted to clamp the article at two points of contact and the other having a clamping surface adapted to clamp the article at one point of contact, whereby said article is locked against longitudinal and rotary movement, and including means for automatically moving said member having the clamping surface to center and clamp articles of different sizes between the members at a constant distance from a given base.

3. In a centering device for articles, a movable support and a stationary support, a clamping member fixed on one of said supports and a positioning and clamping member movable on the other of said supports, the fixed member having an angular bearing recess for the reception of the article to be centered, the other of said members engaging the first named member and movable in a curved recess in its support to engage and center the article.

4. In a centering device for cylindrical articles, a movable support and a stationary support, a clamping member fixed on said movable support, a positioning and clamping member movable on the stationary support, said clamping member having an angular bearing recess for the reception of the article to be centered, adapted to engage said article at two points of contact, one portion of the positioning and clamping member engaging the clamping member and a bearing surface on said positioning and clamping member engaging the periphery of the article at one point of contact, the positioning and clamping member being movable vertically and horizontally in said stationary support to simultaneously clamp and position the article to be centered.

5. A centering device for centering cylindrical articles comprising two relatively movable members one having a clamping recess and the other having a clamping surface said recess and surface being adapted to clamp the article at a total of three points of contact, whereby said article is locked against longitudinal movement and including means for automatically moving one of said members to center and clamp articles of different sizes between the members at a constant distance from a given base.

In testimony whereof, I have hereunto set my hand.

ARTHUR E. PETERS.